US012585441B2

(12) United States Patent
Procopio et al.

(10) Patent No.: US 12,585,441 B2
(45) Date of Patent: Mar. 24, 2026

(54) AUTOMATIC GENERATION OF CHAT APPLICATIONS FROM NO-CODE APPLICATION DEVELOPMENT PLATFORMS

(71) Applicant: Google LLC, Mountain View, CA (US)

(72) Inventors: Michael Jeffrey Procopio, Boulder, CO (US); Sarmad Hashmi, San Jose, CA (US); Rachel Goodman Moore, Kirkland, WA (US); Nicholas Eric Westbury, Seattle, WA (US); Girimurugan Natarajan, Bangalore (IN); Francis Herrera Cortez, San Bruno, CA (US); Carlin Yuen, New Providence, NJ (US)

(73) Assignee: Google LLC, Mountain View, CA (US)

( * ) Notice: Subject to any disclaimer, the term of this patent is extended or adjusted under 35 U.S.C. 154(b) by 14 days.

(21) Appl. No.: 17/937,375

(22) Filed: Sep. 30, 2022

(65) Prior Publication Data

US 2024/0111504 A1    Apr. 4, 2024

(51) Int. Cl.
*G06F 8/38* (2018.01)
*G06F 3/0482* (2013.01)
(Continued)

(52) U.S. Cl.
CPC ............. *G06F 8/38* (2013.01); *G06F 3/0482* (2013.01); *G06F 8/34* (2013.01); *H04L 51/02* (2013.01)

(58) Field of Classification Search
CPC . G06F 8/38; G06F 8/34; G06F 3/0482; H04L 51/02
See application file for complete search history.

(56) References Cited

U.S. PATENT DOCUMENTS 10,466,981 B1    11/2019  MacMillan et al.
10,656,907 B2 *   5/2020  Seolas ..................... G06F 40/35
(Continued)

FOREIGN PATENT DOCUMENTS

CN        108090035 A      5/2018
CN        116414368 A      7/2023

OTHER PUBLICATIONS

Weber, Irene. "Low-code from frontend to backend: Connecting conversational user interfaces to backend services via a low-code IoT platform." Proceedings of the 3rd Conference on Conversational User Interfaces. 2021. (Year: 2021).*

(Continued)

*Primary Examiner* — Bradley A Teets
*Assistant Examiner* — Joanne G Macasiano
(74) *Attorney, Agent, or Firm* — Shumaker & Sieffert, P.A.

(57) ABSTRACT

A method for generation of chat applications includes receiving a deployment request requesting deployment of a no-code application generated by a user within a no-code environment to a chat application environment. The no-code application includes a trigger condition, an action response defining an action in response to the trigger condition being satisfied, and a no-code environment graphical user interface (GUI) view based on the action response. The method includes, after receiving the deployment request, receiving an interaction indication indicating that the trigger condition is satisfied. In response to receiving the interaction indication, the method includes executing the action response, translating the no-code environment GUI view into a chat application GUI view, and transmitting the chat application GUI view to a user device. The chat application GUI view is configured to cause the user device to display the chat (Continued)

application GUI view within the chat application environment.

18 Claims, 9 Drawing Sheets

(51) Int. Cl.
  *G06F 8/34* (2018.01)
  *H04L 51/02* (2022.01)

(56) References Cited

U.S. PATENT DOCUMENTS

| | | | |
|---|---|---|---|
| 11,163,960 B2 | 11/2021 | Saha et al. | |
| 11,381,666 B1 | 7/2022 | Stalioraitis et al. | |
| 11,870,741 B2 | 1/2024 | John et al. | |
| 11,922,143 B1 | 3/2024 | Shapiro et al. | |
| 12,079,584 B2 | 9/2024 | Dua et al. | |
| 2003/0115142 A1 | 6/2003 | Brickell et al. | |
| 2005/0102534 A1 | 5/2005 | Wong | |
| 2006/0248406 A1 | 11/2006 | Qing et al. | |
| 2008/0040681 A1 | 2/2008 | Synstelien et al. | |
| 2008/0052348 A1 | 2/2008 | Adler et al. | |
| 2013/0024808 A1 | 1/2013 | Rainisto | |
| 2014/0067702 A1 | 3/2014 | Rathod | |
| 2016/0210361 A1 | 7/2016 | Pistoia et al. | |
| 2016/0321222 A1* | 11/2016 | Greenberg | G06F 16/9577 |
| 2016/0357373 A1* | 12/2016 | Greenberg | G09G 5/005 |
| 2018/0024814 A1 | 1/2018 | Ouali | |
| 2018/0054464 A1 | 2/2018 | Zhang et al. | |
| 2018/0107461 A1 | 4/2018 | Balasubramanian et al. | |
| 2018/0219921 A1 | 8/2018 | Baer et al. | |
| 2018/0285084 A1 | 10/2018 | Mimlitch, III et al. | |
| 2019/0073197 A1* | 3/2019 | Collins | G06F 8/60 |
| 2019/0268178 A1 | 8/2019 | Fairweather et al. | |
| 2019/0391823 A1 | 12/2019 | Jouhier | |
| 2019/0394150 A1 | 12/2019 | Denoue et al. | |
| 2020/0153750 A1 | 5/2020 | Petys et al. | |
| 2020/0272114 A1 | 8/2020 | Grabowski et al. | |
| 2020/0301678 A1* | 9/2020 | Burman | G06F 9/541 |
| 2020/0374244 A1* | 11/2020 | John | H04L 51/02 |
| 2021/0042094 A1* | 2/2021 | Burman | G06F 9/541 |
| 2021/0044546 A1 | 2/2021 | Taslimi et al. | |
| 2021/0064349 A1 | 3/2021 | Allgeier et al. | |
| 2021/0064685 A1 | 3/2021 | Weizman et al. | |
| 2021/0089618 A1* | 3/2021 | Jain | G06Q 10/00 |
| 2021/0141616 A1 | 5/2021 | Kane | |
| 2021/0141617 A1 | 5/2021 | Burman et al. | |
| 2021/0337249 A1 | 10/2021 | Jain | |
| 2022/0060435 A1 | 2/2022 | Whitten et al. | |
| 2022/0129257 A1 | 4/2022 | Touati et al. | |
| 2022/0244925 A1 | 8/2022 | Moss et al. | |
| 2022/0366147 A1* | 11/2022 | Ho | G06F 40/35 |
| 2022/0374209 A1 | 11/2022 | Shek et al. | |
| 2022/0405068 A1* | 12/2022 | Brown | G06F 8/34 |
| 2023/0107316 A1 | 4/2023 | Ripa et al. | |
| 2023/0110941 A1* | 4/2023 | Makhija | G06F 40/284 |
| | | | 709/224 |
| 2023/0125807 A1 | 4/2023 | Ripa et al. | |
| 2023/0185544 A1 | 6/2023 | Procopia et al. | |
| 2023/0334395 A1* | 10/2023 | Gorro?o | G06F 3/0482 |
| 2023/0339102 A1 | 10/2023 | Tapus et al. | |
| 2023/0393832 A1 | 12/2023 | Touati et al. | |
| 2024/0231766 A1 | 7/2024 | Ferreira et al. | |
| 2024/0256784 A1 | 8/2024 | Harris et al. | |
| 2024/0272877 A1 | 8/2024 | Girdhar | |
| 2024/0370234 A1 | 11/2024 | Procopio et al. | |
| 2024/0412157 A1 | 12/2024 | Manzano et al. | |
| 2025/0068396 A1 | 2/2025 | Procopio et al. | |

OTHER PUBLICATIONS

Sahay, Apurvanand, et al. "Supporting the understanding and comparison of low-code development platforms." 2020 46th Euromicro Conference on Software Engineering and Advanced Applications (SEAA). IEEE, 2020. (Year: 2020).*

ElBatanony, Ahmed, and Giancarlo Succi. "Towards the no-code era: a vision and plan for the future of software development." Proceedings of the 1st ACM SIGPLAN International Workshop on Beyond Code: No. Code. 2021. (Year: 2021).*

Daniel, Gwendal, et al. "Xatkit: a multimodal low-code chatbot development framework." IEEE Access 8 (2020): 15332-15346. (Year: 2020).*

International Search Report and Written Opinion for related PCT Application No. PCT/US2023/034047, dated Feb. 1, 2024.

Google for Developers, "Authenticate as a Google Chat app", Oct. 2022, 7 pp.

Google for Developers, "Build an HTTP Google Chat app", Oct. 2022, 6 pp.

Office Action from U.S. Appl. No. 18/313,226 dated Apr. 11, 2025, 12 pp.

Response to Office Action dated Apr. 11, 2025 from U.S. Appl. No. 18/313,226, filed Jul. 11, 2025, 9 pp.

U.S. Appl. No. 18/628,375, filed Apr. 5, 2024, naming inventors Procopio et al.

"AppSheet—Wikipedia", Wikipedia, 2023, 5 pp., Retrieved from the Internet on Nov. 17, 2025 URL: https://en.wikipedia.org/w/index.php?title=AppSheet&oldid=1163700647.

"Run your app in an iFrame on a web page—AppSheet Help", Google, 2022, 1 pp., Retrieved from the Internet on Nov. 17, 2025 from URL: https://web.archive.org/web/20220528202500/support.google.com/appsheet/answer/10104491.

"Send an email from an automation—AppSheet Help", Google, 2022, 10 pp., Retrieved from the Internet on Nov. 17, 2025 from URL: https://web.archive.org/web/20221104135615/https://support.google.com/appsheet/answer/11447614.

Corrected Notice of Allowance from U.S. Appl. No. 18/313,226 dated Nov. 4, 2025, 2 pp.

Haile, "Implementing a Low-Code AI-Based Chatbot on Azure combined with Boomi Integration", Bachelor's Thesis, Haaga-Helia University of Applied Sciences, 2022, 72 pp.

Keisala, "Utilizing Large Language Models as No. code Interface in a Software Development Toolkit", Bachelor's Thesis, Jamk University of Applied Sciences, May 2023, 82 pp.

Masili, "No-code development platforms: breaking the boundaries between IT and business experts", vol. 13, No. 1, International Journal of Economic Behavior (IJEB), Apr. 10, 2023, 17 pp.

Notice of Allowance from U.S. Appl. No. 18/313,226 dated Oct. 23, 2025, 9 pp.

Response to Communication Pursuant to Rules 161(1) and 162 EPC dated May 9, 2025, from counterpart European Application No. 23800610.0, filed Nov. 10, 2025, 55 pp.

Matt, "How To Create A Clickable Link To A Specific Record (for an AppSheet app)", MultiTech Visions, Mar. 16, 2023, 7 pp., Retrieved from the Internet on Nov. 24, 2025 from URL: https://www.multitechvisions.com/post/how-to-create-a-clickable-link-to-a-specific-record-for-an-appsheet-app.

Lugovsky, "Low Code vs No Code: Full Analysis 2025", UI Bakery, Inc., Aug. 14, 2023, 15 pp.

Talesra et al., "Low-Code Platform for Application Development", International Journal of Applied Engineering Research, vol. 16, No. 5, May 31, 2021, 6 pp.

* cited by examiner

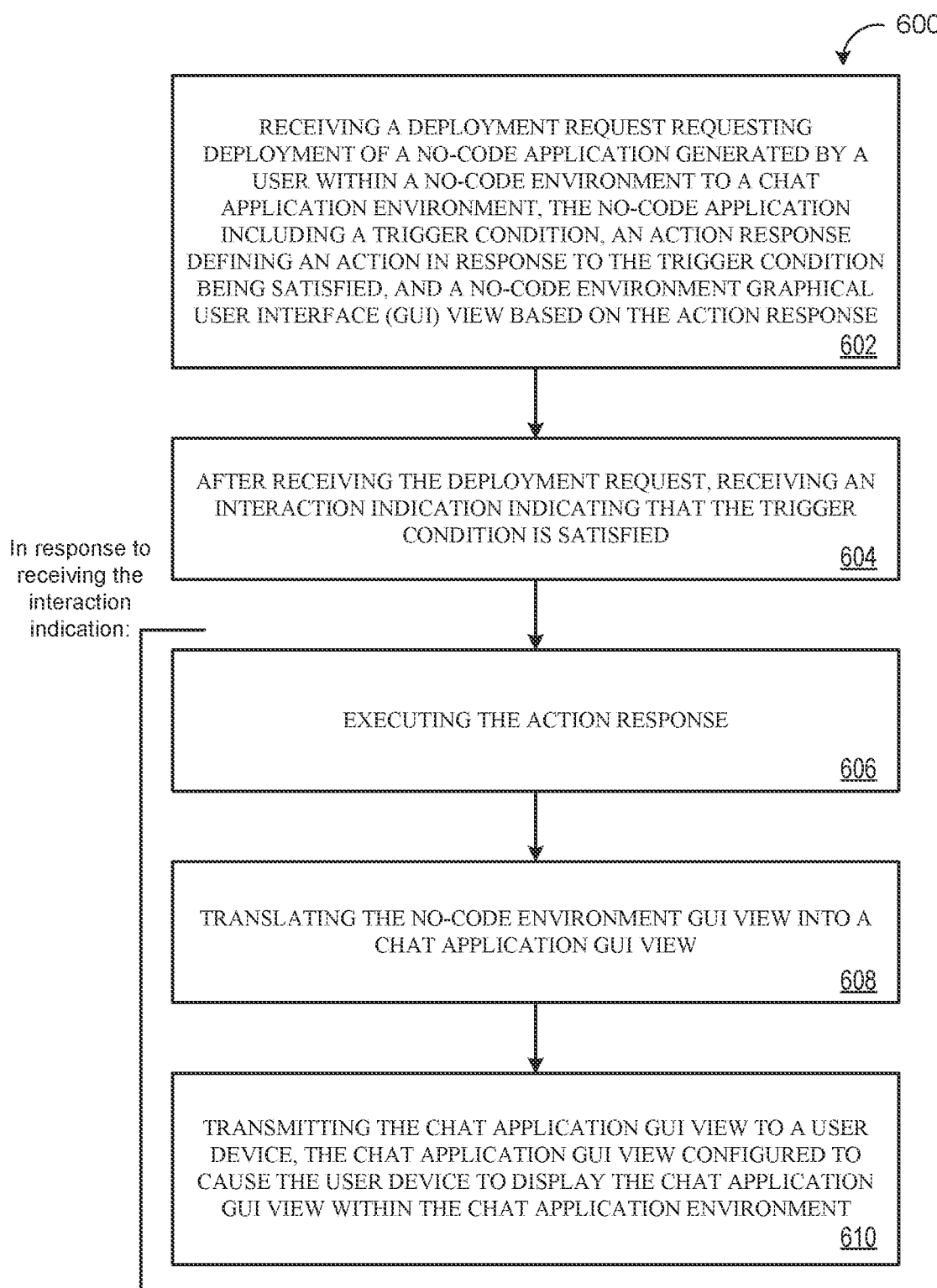

In response to
receiving the
interaction
indication:

600

RECEIVING A DEPLOYMENT REQUEST REQUESTING DEPLOYMENT OF A NO-CODE APPLICATION GENERATED BY A USER WITHIN A NO-CODE ENVIRONMENT TO A CHAT APPLICATION ENVIRONMENT, THE NO-CODE APPLICATION INCLUDING A TRIGGER CONDITION, AN ACTION RESPONSE DEFINING AN ACTION IN RESPONSE TO THE TRIGGER CONDITION BEING SATISFIED, AND A NO-CODE ENVIRONMENT GRAPHICAL USER INTERFACE (GUI) VIEW BASED ON THE ACTION RESPONSE
602

AFTER RECEIVING THE DEPLOYMENT REQUEST, RECEIVING AN INTERACTION INDICATION INDICATING THAT THE TRIGGER CONDITION IS SATISFIED
604

EXECUTING THE ACTION RESPONSE
606

TRANSLATING THE NO-CODE ENVIRONMENT GUI VIEW INTO A CHAT APPLICATION GUI VIEW
608

TRANSMITTING THE CHAT APPLICATION GUI VIEW TO A USER DEVICE, THE CHAT APPLICATION GUI VIEW CONFIGURED TO CAUSE THE USER DEVICE TO DISPLAY THE CHAT APPLICATION GUI VIEW WITHIN THE CHAT APPLICATION ENVIRONMENT
610

FIG. 6

AUTOMATIC GENERATION OF CHAT APPLICATIONS FROM NO-CODE APPLICATION DEVELOPMENT PLATFORMS

TECHNICAL FIELD

This disclosure relates to automatically generating chat applications.

BACKGROUND

No-code development platforms allow programmers and non-programmers to create application software via graphical user interfaces as opposed to conventional programming techniques. Thus, no-code platforms enable business technologists and citizen developers of all skill levels to build power applications and workflows for their organizations without the need to write any code.

Chat applications may be web applications or services that execute within a chat application. For example, chat applications may receive synchronous chat events (e.g., a message is received or a user was added to the conversation) and respond with an appropriate message (e.g., static text or complex dialog) or update an existing message. Chat applications are increasingly used to deliver round-the-clock support to both internal and external customers, thereby helping many industries streamline and optimize the customer experience.

SUMMARY

One aspect of the disclosure provides for automatic generation of chat applications from no-code application development platforms or environments. The computer-implemented method, when executed by data processing hardware, causes the data processing hardware to perform operations. The operations include generating, by an author using a no-code environment, a no-code application that includes a trigger condition, an action response defining an action in response to the trigger condition being satisfied, and a no-code environment graphical user interface (GUI) view based on the action response. The operations include receiving a deployment request requesting deployment of the no-code application. The operations include, after receiving the deployment request, receiving an interaction indication indicating that the trigger condition is satisfied. In response to receiving the interaction indication, the operations include executing the action response, translating the no-code environment GUI view into a chat application GUI view, and transmitting the chat application GUI view to a user device. The chat application GUI view is configured to cause the user device to display the chat application GUI view within the chat application environment.

Implementations of the disclosure may include one or more of the following optional features. In some implementations, the chat application GUI view includes a chat card. The trigger condition, in some examples, includes a user interaction with the chat application environment. In some of these examples, the user interaction includes a slash command, an emoji, or a keyword.

Optionally, the trigger condition includes a modification to a data repository. The modification to the data repository may include adding or updating a row of a table. In some implementations, the operations further include, after transmitting the chat application GUI view to the user device, receiving, from the user device, a user interaction indication indicating a user interaction with the chat application environment and modifying, using the no-code application, a data repository based on the user interaction indication.

In some examples, the operations further include, determining that a user of the user device is authorized to access the no-code application. Translating the no-code environment GUI view into the chat application GUI view may be based on determining that the user of the user device is authorized to access the no-code application. The action response may include a direct message to a single user of the chat application environment. Additionally or alternatively, the action response includes a group message to a plurality of users of the chat application environment.

Another aspect of the disclosure provides a system for automatic generation of chat applications from no-code application development platforms or environments. The system includes data processing hardware and memory hardware in communication with the data processing hardware. The memory hardware stores instructions that when executed on the data processing hardware cause the data processing hardware to perform operations. The operations include receiving a deployment request requesting deployment of a no-code application generated by a user within a no-code environment to a chat application environment. The no-code application includes a trigger condition, an action response defining an action in response to the trigger condition being satisfied, and a no-code environment graphical user interface (GUI) view based on the action response. The operations include, after receiving the deployment request, receiving an interaction indication indicating that the trigger condition is satisfied. In response to receiving the interaction indication, the operations include executing the action response, translating the no-code environment GUI view into a chat application GUI view, and transmitting the chat application GUI view to a user device. The chat application GUI view is configured to cause the user device to display the chat application GUI view within the chat application environment.

This aspect may include one or more of the following optional features. In some implementations, the chat application GUI view includes a chat card. The trigger condition, in some examples, includes a user interaction with the chat application environment. In some of these examples, the user interaction includes a slash command, an emoji, or a keyword.

Optionally, the trigger condition includes a modification to a data repository. The modification to the data repository may include adding or updating a row of a table. In some implementations, the operations further include, after transmitting the chat application GUI view to the user device, receiving, from the user device, a user interaction indication indicating a user interaction with the chat application environment and modifying, using the no-code application, a data repository based on the user interaction indication.

In some examples, the operations further include, determining that a user of the user device is authorized to access the no-code application. Translating the no-code environment GUI view into the chat application GUI view may be based on determining that the user of the user device is authorized to access the no-code application. The action response may include a direct message to a single user of the chat application environment. Additionally or alternatively, the action response includes a group message to a plurality of users of the chat application environment.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 6 a flowchart of an example arrangement of operations for a method for automatic generation of chat applications from no-code application development platforms or environments

Like reference symbols in the various drawings indicate like elements.

DETAILED DESCRIPTION

Figure 1:
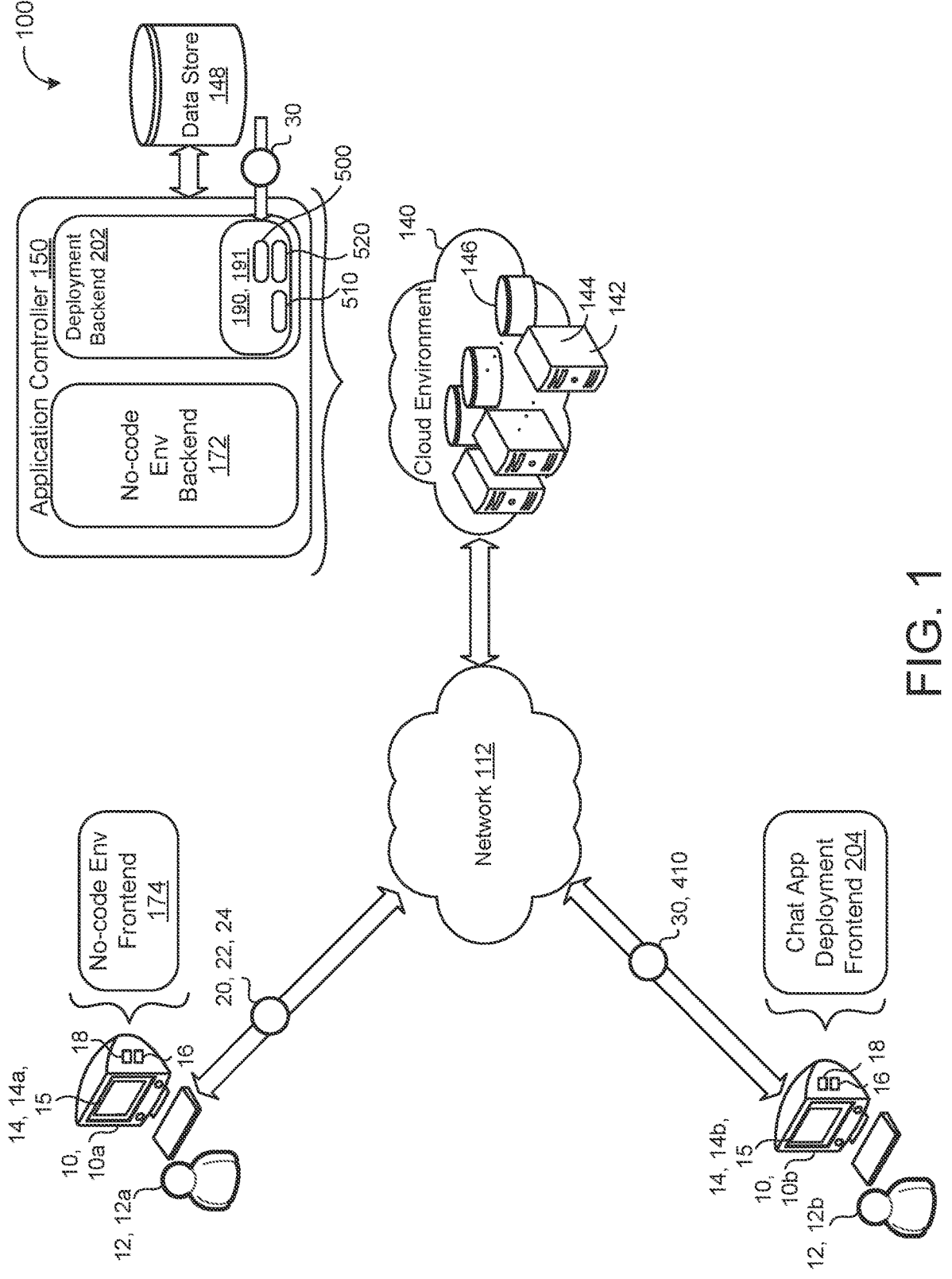
FIG. 1 is a schematic view of an example system for automatic generation of chat applications from no-code application development platforms or environments.

Chat applications may be web applications or services that execute within a chat application. For example, chat applications may receive synchronous chat events (e.g., a message is received or a user was added to the conversation) and respond with an appropriate message (e.g., static text or complex dialog) or update an existing message. Chat applications are increasingly used to deliver round-the-clock support to both internal and external customers, thereby helping many industries streamline and optimize the customer experience.

Chat applications (i.e., chat "apps") are a common type of chat application. Chat applications are, at a basic level, computer programs that simulate and process human conversation (either written or spoken), allowing users to interact with digital devices as if they were communicating with a real person. Chat application users may interact with the chat application via freeform natural language or by way of more structured approaches (e.g., slash commands). In many ways, chat applications can be thought of as "chat wrappers" around applications, automations, and third party integrations with external data sources that allow those functions to be called and interacted with in chat, so that the user never has to leave their conversation to get data or perform a task. An ideal chat application allows users to perform virtually any data push, pull, or push and pull interaction with virtually any data source without taking the user out of their immediate context.

Chat applications may be segmented into two primary categories. First, public, consumer-facing chat applications provide customer service such as to provide feedback on a recent purchase. These are commonly referred to as external chat applications. Private, organization-specific chat applications may be designed to address specific needs within a company such as file vacation requests, assist with inventory lookups, manage approval flows, post new sales deals, or provide information about a bug or service outage. These are conventionally referred to as internal chat applications.

External chat applications are mainly served by purpose-built products and the organizations that build them. In contrast, internal chat applications are often add-ons (native or otherwise) to a company's synchronous messaging platform. This allows the chat applications to be able to "meet users where they are at" to provide a quick, on-demand answer or complete an otherwise time consuming task to save significant resources.

No-code development platforms allow programmers and non-programmers to create application software via graphical user interfaces as opposed to conventional programming techniques. Thus, no-code platforms enable business technologists and citizen developers of all skill levels to build power applications and workflows for their organizations without the need to write any code. Combining no-code development platforms with chat applications democratizes the chat application creation process so that anyone, in any role, has the skill needed to set up a chat application.

Implementations herein include systems and methods that provide application creators the ability to one-click publish and deploy chat applications to allow end users the ability to interact with automations without leaving a chat application environment. Within the chat application environment, users interact with the chat applications using, for example, chat cards and/or dialogs. Based on user-initiated events within the chat application environment, the chat application executes automations that may interact with external data sources (e.g., tables, databases, etc.). The chat applications may send messages to a user or chat space based on automation triggers.

Referring to FIG. 1, in some implementations, a chat application generation system 100 includes a remote system 140 in communication with one or more user devices 10 each associated with a respective user 12 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 148 (i.e., a remote storage device) may be overlain on the storage resources 146 to allow scalable use of the storage resources 146 by one or more of the clients (e.g., the user device 10) or the computing resources 144.

The remote system 140 is configured to communicate with the user devices 10 via, for example, the network 112. The user device(s) 10 may correspond to any computing device, such as a desktop workstation, a laptop workstation, or a mobile device (i.e., a smart phone). Each user device 10 includes computing resources 18 (e.g., data processing hardware) and/or storage resources 16 (e.g., memory hardware). The data processing hardware 18 executes a graphical user interface (GUI) 14 for display on a screen 15 in communication with the data processing hardware 18.

The remote system 140 executes an application controller 150. The application controller 150 includes a no-code environment backend 172 (e.g., a no-code application development environment). A first user 12, 12a may communicate with the no-code environment backend 172 via, for example, a first user device 10, 10a and a no-code environment frontend 174 provided by the no-code environment backend 172. For example, the user 12a interacts with the no-code environment frontend 174 using a first GUI 14, 14a displayed on the screen 15. The combination of the no-code environment backend 172 and the no-code environment frontend 174 comprise a no-code environment. As discussed in more detail below, the GUI 14a provided by the no-code environment backend 172 may be a web-based GUI 14 (e.g., accessed via a web browser) and provides the user 12a with an interactive, visual workspace to build, execute, and publish no-code applications 190. In other examples, the no-code environment frontend 174 is executed by an application executing on the first user device 10a. The GUI 14a allows the user 12a to drag and drop application routines or sub-routines into an editing area where they may be connected to form an application 190. Notably, the user 12 does not require programming skills to generate the application 190. For example, the user 12a selects one or more trigger conditions 510 such as a modification to a data repository (e.g., a row being added to a table or a database or a row being updated/modified) and action responses 520 (e.g., sending a notification) that the application 190 executes in response to a trigger condition 510 being satisfied. The application 190 may interact with data stored at the data store 148. For example, the application 190 may monitor for changes within data stored at the data store 148 for the trigger condition 510 and/or modify data stored at the data store 148 for the action response 520. The user 12a may select a data source for the application 190. For example, the user 12a directs the application controller 150 to one or more data elements (e.g., tables, databases, etc.) stored at the data store 148 when generating the application 190. The application 190 may support many different use cases, such as email automation (e.g., sending customized messages to internal or external users), creating invoices/decks/reports (e.g., generating files at a specified location using templated content), connecting services (e.g., send/return data from external services), and/or scheduling automated data manipulation/logic (e.g., run advanced business logic on data).

The application 190 includes a no-code environment GUI view 500 based on the action response 520. The no-code environment GUI view 500 represents a user interface (UI) view of the application 190 within the no-code environment. That is, the no-code environment GUI view 500 represents the UI the first user 12a views when authoring, configuring, and otherwise interacting with the application 190 via the first GUI 14a.

In some examples, the application controller 150 receives a trigger interaction indication 20 indicating a graphical user interaction with the GUI 14 by the user 12a via the no-code environment frontend 174 (i.e., within the no-code environment) where the user 12a sets/defines a trigger condition 510. In response to receiving the trigger interaction indication 20, the application controller 150 establishes the trigger condition 510 for the application 190 generated by the no-code environment 172, 174. The application controller 150 also receives an action interaction indication 22 indicating another graphical user interaction with the GUI 14 by the user 12a via the no-code environment frontend 174. In response to receiving the action interaction indication 22, the application controller 150 defines an action response 520 for the application 190 when the trigger condition 510 is satisfied. That is, as described in more detail below, the action response 520 defines a behavior of the application 190 when the trigger condition 510 is satisfied. For example, when the trigger condition 510 indicates a change to a value within a table stored in the data store 148, the application controller 150 defines an action response 520 for the application 190 that includes generating a notification to a user 12. The user 12a may publish or otherwise deploy the application 190 (e.g., via a chat application deployment backend 202 and/or a chat application deployment frontend 204) such that the application controller 150 executes the application 190.

In some implementations, during or after the user 12a configures the application 190 (e.g., sets one or more trigger conditions 510 and one or more action responses 520), the user 12a may publish and/or deploy the application 190 as a chat application 191 using the chat application deployment backend 202 via a deployment request 24. For example, the user 12a may configure the application 190 as a chat application based on setting the trigger conditions 510 and/or the action responses 520. In other examples, the user 12a, while selecting deployment or publishing options, selects a chat application option, causing the application controller 150 to deploy the application 190 as a chat application 191 in addition to alternatively to a traditional application.

The chat application deployment backend 202 may execute the chat application 191 and expose the chat application 191 via the chat application deployment frontend 204 (i.e., a chat application environment frontend) to a second user 12, 12b. The combination of the chat application deployment backend 202 and the chat application deployment frontend 204 together provide a chat application environment. The second user 12b may be the same or different from the first user 12a. That is, the application controller 150 may deploy the chat application 191 for a user 12 that is different than the user 12 that authored the chat application 191. The second user 12a, for example, interacts with the chat application 191 via a second GUI 14, 14b executing on a second user device 10, 10b. The second GUI 14b allows the second user 12b to interact with the chat application deployment frontend 204 to, for example, send and receive messages with other users 12. The chat application deployment frontend 204 may execute on the second user device 10b, the first user device 10a, another user device (not shown), the remote system 140, or any combination thereof.

Once the chat application 191 is deployed to the chat application environment, the application controller 150 receives an application interaction indication 30 indicating that the trigger condition 510 of the chat application 191 is satisfied. As described in more detail below, the application interaction indication 30, in some examples, originates from the second user 12b interacting with the chat application 191 via the chat application deployment frontend 204. In other examples, the application interaction indication 30 originates from another source, such as from an interaction with the data store 148 or from interaction with the application 190 from a non-chat user. In response to receiving the application interaction indication 30 indicating that the trigger condition 510 is satisfied, the application controller 150 executes the corresponding action response 520 and translates the no-code environment GUI view 500 into a chat application GUI view 410. Here, the chat application GUI view 410 is configured to cause a user device to display the chat application GUI view 410 within the chat application environment (e.g., on a screen 15 of the user device 10). The application controller 150 may transmit the chat application GUI view 410 to the second user device 10, which in turn displays the chat application GUI view 410 to the second user 12b via the second GUI 14b. That is, the second user 12b, via the chat application GUI view 410, views a graphical representation of the chat application 191.

Figure 2:
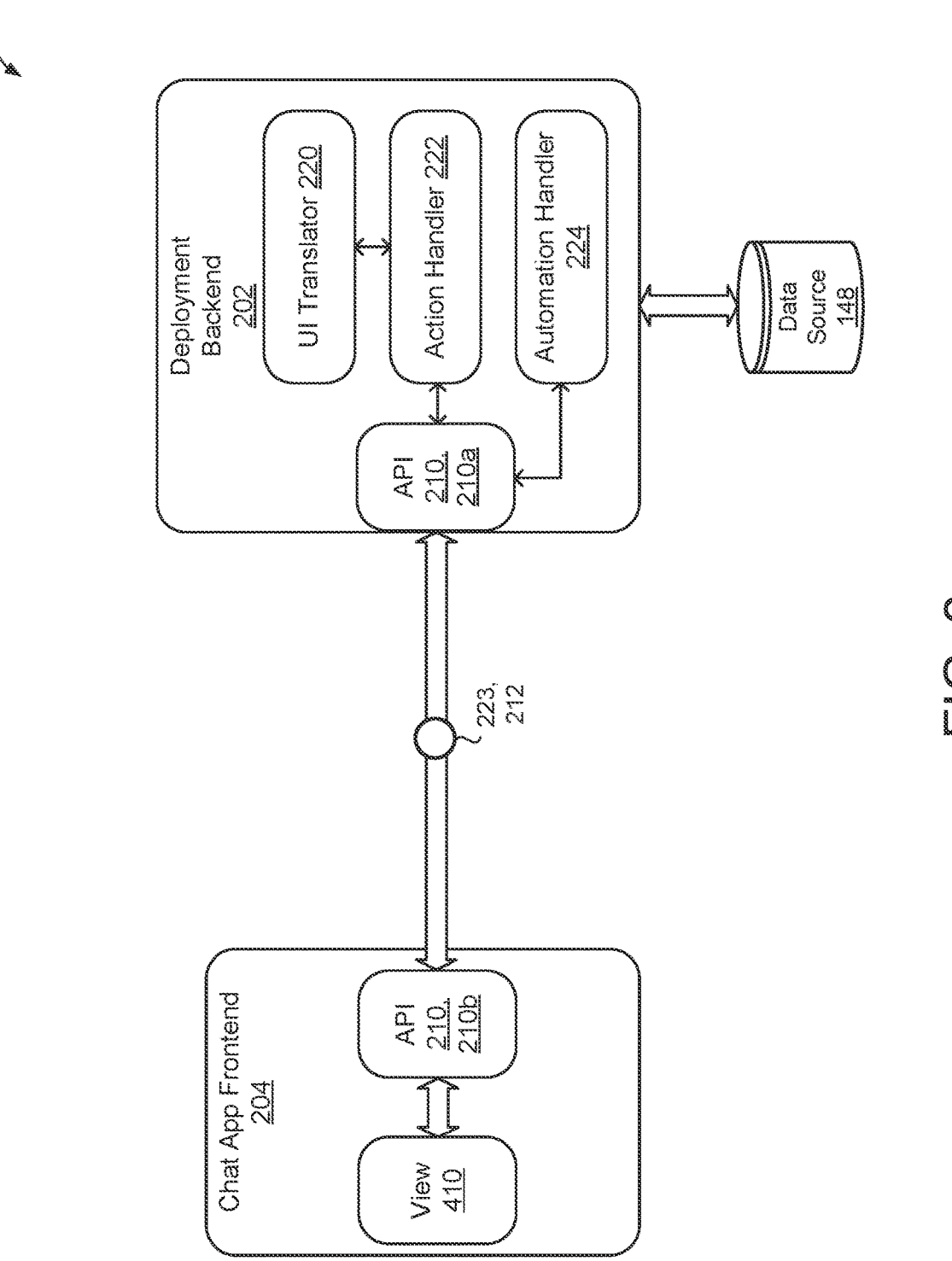
FIG. 2 is a schematic view of exemplary components of the system of FIG. 1.

Referring now to FIG. 2, a schematic view 200 includes exemplary components of the chat application deployment backend 202. Here, the chat application deployment backend 202 includes a UI translator 220 that translates the no-code environment GUI view 500 into the chat application GUI view 410. As described in more detail below, the chat application GUI view 410 may include a "chat card" or dialog (e.g., a UI JavaScript Object Notation (JSON) object). The chat card represents a graphic rendered directly within the chat application environment that provides visual information to the user 12. The chat card may include an "inline card" (FIG. 4A) that is rendered within a chat box UI (e.g., a UI widget embedded inline with chat text). Alternatively, the chat card may include a "popup" (FIG. 4B) that may be rendered outside of the chat box UI. The popup chat card, in some implementations, is moveable and/or resizable by the user. In some examples, the chat card is interactive and allows the user to select or otherwise interact with the chat card to retrieve additional information or provide information to the chat application 191.

The chat application GUI view 410 may be dependent or based upon the action response 520. For example, the action response 520 may include generating an approval request, and subsequently the chat application GUI view 410 may provide a user 12 with the ability to approve or reject the approval request. In this example, the chat application 191 renders a chat card detailing the approval request and requesting the user 12 to approve or reject the approval request. The UI translator 220 may provide/translate the chat application GUI view 410 based on actions by a user 12 (e.g., by interacting with the chat application 191 via the chat application deployment frontend 204) or based on one or more trigger conditions 510 satisfying an action response 520. For example, a row is added to a table stored in the data store 148, triggering the chat application 191 to send a notification to a user 12 via the chat application environment. As another example, an element of a row (e.g., a column or field) is changed (such as by changing an approval status in a column in an approval entry row of a pending approvals table), triggering the chat application 191 to send a notification to a user 12 (e.g., indicating that a change was approved) via the chat application environment.

In this example, the chat application deployment backend 202 also includes an action handler 222 that is responsible for all user interactions with the chat application 191. The action handler 222 may interact with the UI translator 220 to instruct the UI translator 220 to construct the chat application GUI view 410 based on, for example, chat actions 223. Chat actions 223 include any interactions the user 12 may have with the chat application 191, such as navigation actions, data exchange actions, external communications, or composite actions. That is, chat actions 223 define how the user 12 interacts with the chat application 191. The chat actions 223 may include any interaction by the user 12 with the chat application 191 that is not explicitly defined by the action response 520 (i.e., actions implicitly included with the chat application 191 such as clicking an action in a chat card).

The action handler 222 maintains a current application state for the chat application 191. That is, the action handler 222 tracks and stores all of the information generated by user interactions with the chat application 191 that is needed to move that chat application 191 to subsequent states. The action handler 222 may also direct the UI translator 220 to generate specific chat application GUI views 410 (e.g., in response to navigation commands from the user 12). Additionally or alternatively, the action handler 222 executes data change actions, such as by updating data underlying views and instructing the UI translator 220 to generate chat application GUI views 410 reflecting the updated data.

In some examples, the chat application deployment backend 202 includes an automation handler 224. The automation handler 224 processes or executes "automations" (e.g., action responses 520) when the trigger condition 510 is satisfied by a user 12 interacting with the chat application 191 within the chat application environment frontend 204. For example, the user 12 sends a specific emoji configured by the chat application author (i.e., the first user 12a), the automation handler 224 may execute the appropriate action response 520 (e.g., modifying data in a data repository, generate an approval request for another user 12, displaying a chat card, etc.).

In some implementations, the chat application deployment backend 202 includes a backend application programming interface (API) 210, 210a that receives all incoming chat messages 212 from the chat application environment (i.e., chat messages entered by users 12 via the chat application deployment frontend 204). The backend API 210a includes a lightweight processor for processing incoming chat messages 212 and chat actions 223 with minimal logic to forward requests to other modules of the chat application deployment backend 202 (e.g., the action handler 222, the automation handler 224, etc.) based on contents of the chat messages 212 and/or chat actions 223. The backend API 210a may include authorization and/or authentication procedures for ensuring users 12 are authorized for a particular action or response. For example, the backend API 210a verifies that a user 12 has authorization to access the chat application 191 (e.g., via user credentials, tokens, access lists, etc.) prior to forwarding a chat action 223 from the user 12 to the action handler 222 and/or translating the no-code environment GUI view 500.

The backend API 210a may communicate with the chat application frontend 204 via the chat application 191 and a frontend API 210, 210b. The frontend API 210b may receive and process chat application GUI views 410 from the chat application deployment backend 202 and provide the chat messages 212 and/or chat actions 223 to the chat application deployment backend 202.

Figure 3:
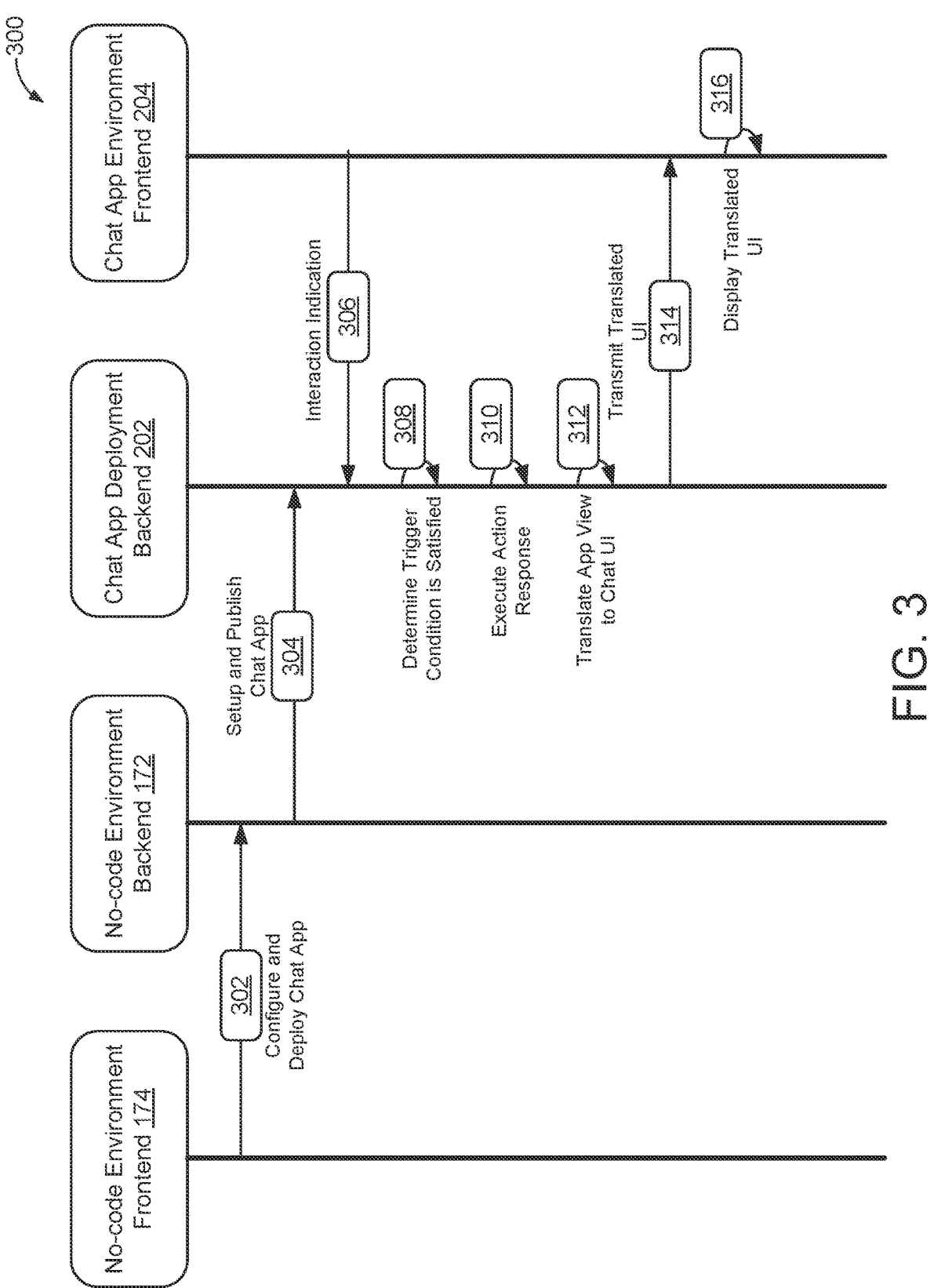
FIG. 3 is an exemplary sequence diagram for the system of FIG. 1.

Referring now to FIG. 3, a sequence diagram 300 describes an exemplary sequence of steps 302-316 detailing deployment and use of a chat application 191. Here, at step 302, the user 12a, via the no-code environment frontend 174, transmits a deployment request 24 to the no-code environment backend 172 asking for deployment of a chat application 191 authored by the user 12a within the no-code environment frontend 174. The no-code environment backend 172, in response to the deployment request 24, at step 304, provides setup for the chat application 191 and publishes the chat application 191. Publication of the chat application 191, in some examples, includes publishing the chat application 191 to a marketplace or other application repository that the chat application deployment backend 202 may access. Publication of the chat application 191, in other examples, includes publishing the chat application 191 directly to the chat application deployment backend 202. Regardless, publication of the chat application 191 allows the chat application deployment backend 202 access to the chat application 191.

After the chat application 191 has been published to the chat application deployment backend 202, the chat application deployment backend 202, at step 306, receives an application interaction indication 30 indicating that a trigger condition 510 of the chat application 191 has been satisfied. The application interaction indication 30 may satisfy a trigger condition 510 explicitly defined by the author of the chat application 191 (e.g., a row added to a table or a user providing a specific slash command) or an interaction inherent or implicit to the chat application 191 (e.g., clicking an action in a chat card).

The chat application deployment backend 202, at step 308, processes the application interaction indication 30 to determine whether the interaction indication warrants action (e.g., a trigger condition 510 is satisfied or other chat action 223 requires a response). When the trigger condition 510 is satisfied or otherwise the chat application deployment backend 202 determines a response is necessary, the chat application deployment backend 202, at step 310, executes a response (e.g., the action response 520 or other appropriate response determined by the action handler 222 or the automation handler 224). In addition to executing the response, the chat application deployment backend 202, at step 312, translates the no-code environment GUI view 500 into the chat application GUI view 410 (e.g., at the UI translator 220). The user device 10 will render the chat application GUI view 410 for viewing by the user 12 of the user device 10.

The chat application deployment backend 202, at step 314, sends the chat application GUI view 410 to the chat application environment frontend 204. The chat application environment frontend 204 displays the chat application GUI view 410, at step 316, on the user device 10b for viewing by the user 12b. For example, and as described in more detail below, the chat application GUI view 410 renders a chat card with information based on the action response (e.g., providing actions to the user, confirming actions performed by the application controller 150, etc.).

Figure 4A:
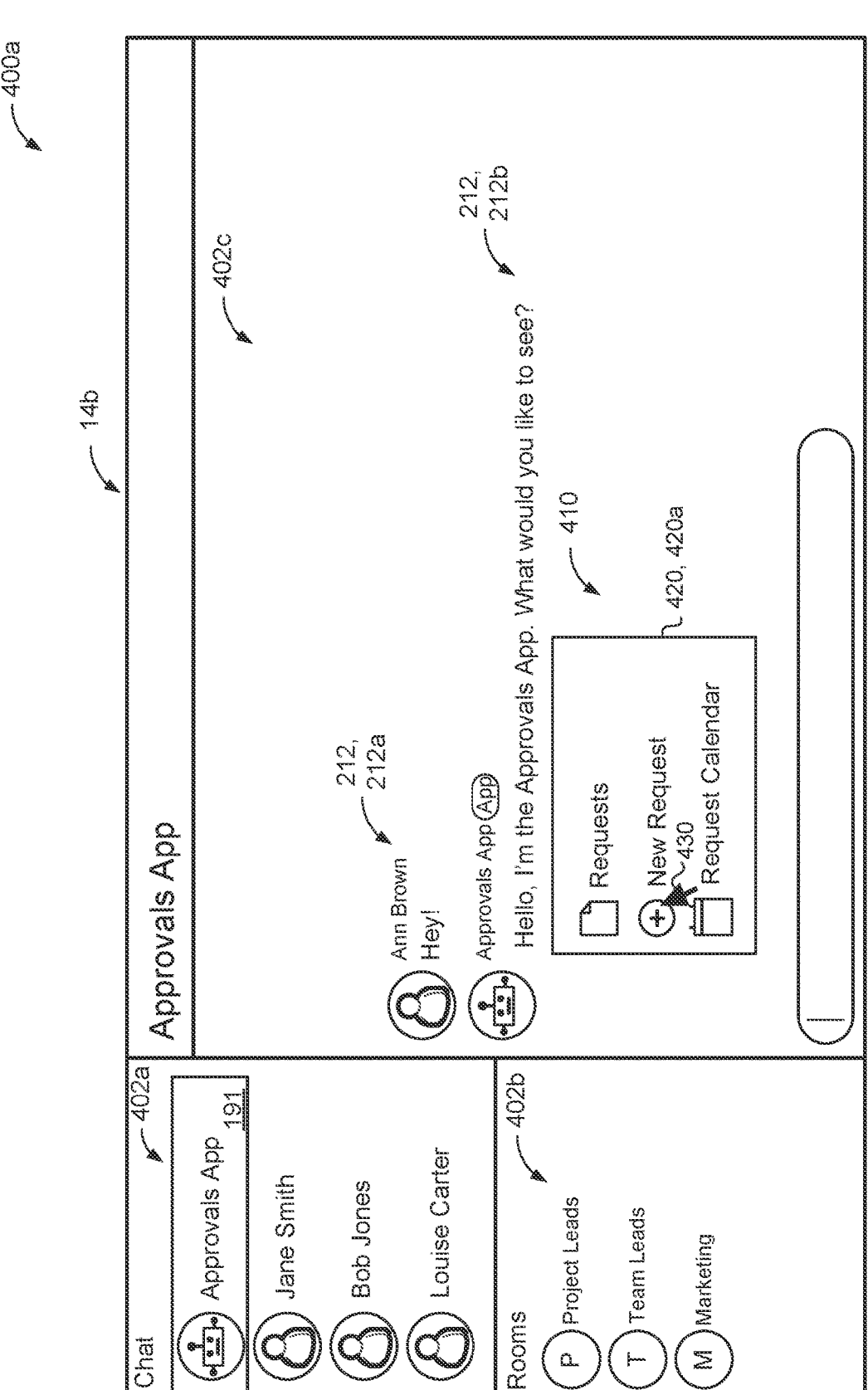
FIGS. 4A-4C are schematic views of exemplary graphical user interfaces for a chat application environment.

Referring now to FIG. 4A, a schematic view 400a includes an exemplary GUI 14b displayed on the screen 15 of the second user device 10b when the user 12b is interacting with the chat application environment frontend 204. Here, the GUI 14b is split into a users pane 402a, a rooms pane 402b, and a chat pane 402c. The users pane 402a allows the user 12b to select a single individual to directly message (e.g., text message, images, voice message, emojis, etc.). For example, the user 12b may select "Jane Smith" to send messages directly to and receive messages directly from a user associated with a "Jane Smith" profile. The rooms pane 402b allows the user to send and receive messages from a group of people simultaneously (i.e., "group messaging"). The chat pane 402c displays a history of the currently selected chat location (i.e., from the users pane 402a or the room pane 402b) along with input options to provide additional messages.

In some examples, the chat applications 191 may be represented in the GUI 14b as an individual that the user 12b may interact and message with. In this example, the users pane 402a includes an "Approvals App" chat application 191. The Approvals App is a chat application 191 authored and published by a user 12 and deployed to the chat application environment frontend 204 by, for example, the user 12b, the author of the chat application 191, or administrator, etc. In this example, the user 12b (i.e., "Ann Brown") has selected the Approvals App in the users pane 402a and a history of communications with the Approvals App is visible in the chat pane 402c. Ann Brown initially communicated with the Approvals App via a direct message 212, 212a "Hey!" that was transmitted by the chat application environment frontend 204 to the chat application deployment backend 202. Here, the Approvals App (i.e., the chat application 191) responds to the message 212a with a response message 212, 212b "Hello, I'm the Approvals App. What would you like to see?" and the chat application GUI view 410.

In this example, the chat application GUI view 410 takes the form of an interactive chat card 420, 420a. The chat card 420a provides the user 12b with three separate interactions (i.e., a "Requests" action, a "New Request" action, and a "Request Calendar" action). The chat card 420a is rendered directly into the chat pane 402c in response to the user 12b interacting with the chat application 191 (i.e., the message 212 in this example). In this instance, chat card 420a allows the user 12b, using a cursor 430, to select the "New Request" action. The chat card 420a may allow other forms of user interaction (e.g., touch, voice commands, etc.).

Figure 4B:
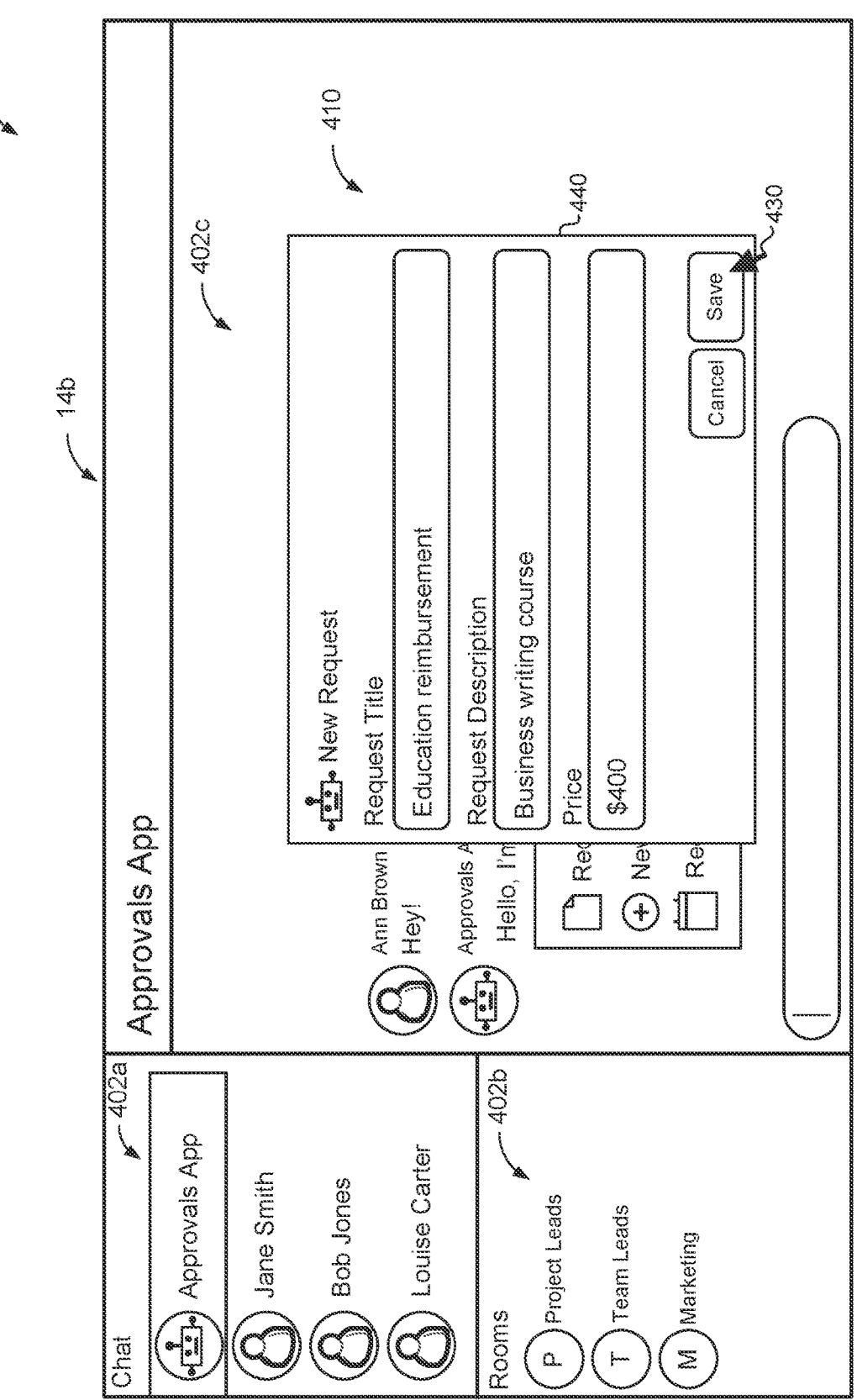

Referring now to FIG. 4B, a schematic view 400b continues the example of FIG. 4A where the chat application GUI view 410, in response to the user 12b selecting the "New Request" action (FIG. 4A), updates to include a data request card 440. The data request card 440, in this example, requests that the user 12b provide a "Request Title," a "Request Description," and a "Price." Each request includes a corresponding text field allowing the user 12b to input the requested data. While in this example, the user 12b enters the data via text (e.g., using a keyboard), any forms of data input may be supported (e.g., voice commands). Here, the user 12b, using the cursor 430, selects a "Save" option, thus submitting the request to the chat application 191. Submission of the data (i.e., the new request data in this example) may cause any number of action responses 520 to be performed. Here, the new request may be added to a request table that includes a column for title, a column for description, and a column for price. The addition of the row to the table may trigger other trigger conditions 510 of the same chat application 191 or other applications 190 (which may or may not include chat applications 191).

Thus, in some implementations, after transmitting the chat application GUI view 410 to the user device 10, the application controller 150 receives from the user device 10, a user interaction indication indicating a user interaction with the chat application environment. In response, the application controller 150 modifies, via the action response 520 of the chat application 191 and based on the user interaction indication, a data repository. For example, the user interaction indication includes the data provided in the data request card 440 of FIG. 4B and selection of the "Save" user input, which causes the chat application 191 to modify a data repository by adding a row to a table.

Figure 4C:
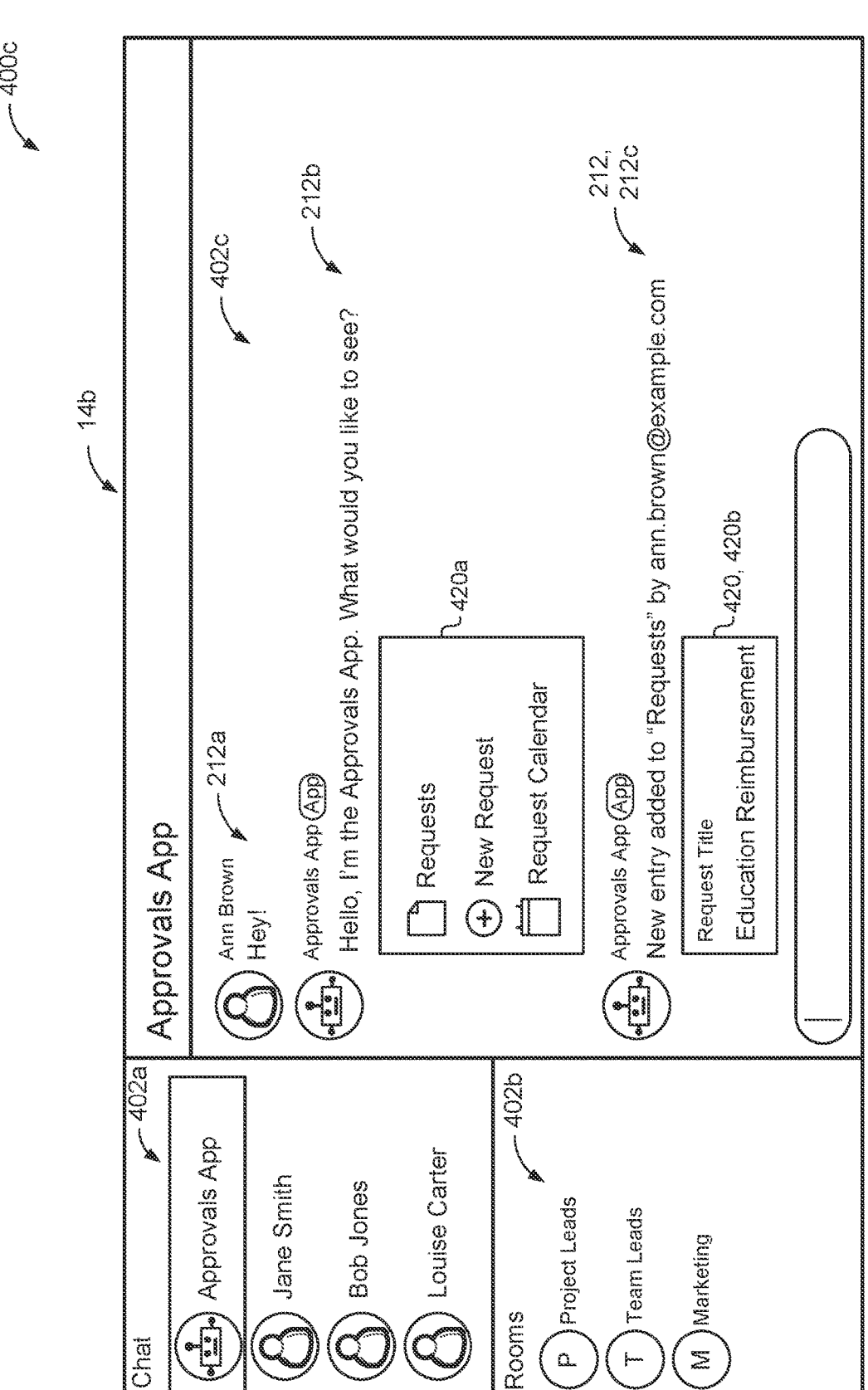

Referring now to FIG. 4C, a schematic view 400c continues the example of FIG. 4B. Here, the message history of the chat pane 402c has been updated to include, after the user 12b submitted the new request, another message 212, 212c from the Approvals App and a second chat card 420, 420b acknowledging and confirming submission of the request. In this example, the Approvals App responds to the new request with the non-interactive chat card 420b that confirms that a request titled "Education Reimbursement" has been successfully submitted.

While the examples of FIGS. 4A-4C involve a user 12 exchanging messages directly with a chat application 191, additionally or alternatively, the chat applications 191 may be added to "rooms" or "groups" or "spaces" where multiple users 12 chat or message simultaneously. In these and other examples, the chat applications 191 may be invoked or interacted using any number of interaction commands. In some examples, a user 12 interacts with the chat application using one or more "slash commands." For example, the user 12b in the previous example may invoke the Approvals App by providing a message including "/approvals" into the chat space. Such a command may trigger the message 212b and the chat card 420. The chat applications 191 may support any number of slash commands or other inputs. For example, the user 12b invokes the data request card 440 directly via the slash command "/newrequest." While slash commands are used as an example, the chat applications may be invoked or interacted with using any other means that allow messages to the chat application 191 to be discerned from messages to other users 12 (e.g., using other delimiters such as @ symbols, hyphens, periods, emojis, etc.). In some examples, the chat application is invoked using one or more specified keywords. The author of the chat application 191, during configuration or publication of the chat application 191, may explicitly define the interaction commands (e.g., the slash commands). In other examples, the chat applications 191 use default interaction commands or automatically derived interaction commands.

Figure 5:
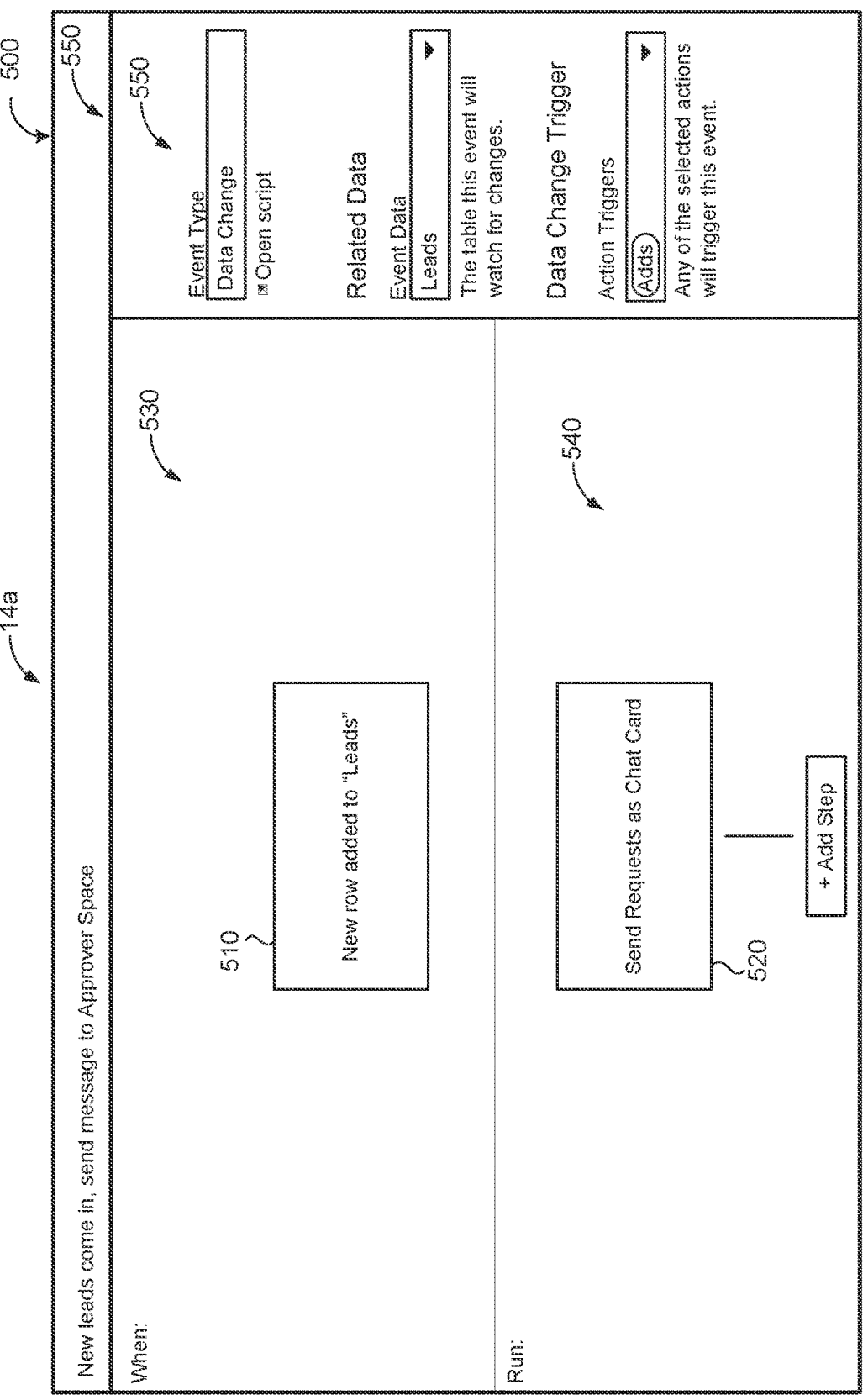
FIG. 5 is a schematic view of an exemplary graphical user interface for a no-code environment.

Referring now to FIG. 5, an exemplary no-code environment view 500 is displayed within a GUI 14a displayed on the screen 15 of the first user device 10a when the user 12a is interacting with the no-code environment frontend 174 provided by the no-code environment backend 172 to create the chat application 191 (including the chat application 191). Here, the GUI 14a is split into an event pane 530, a run pane 540, and a settings pane 550. The event pane 530 displays a graphical representation of a trigger condition 510. The user 12a specifies details that will satisfy the trigger condition 510. Here, the trigger condition 510 is satisfied when a new row is added to a "Leads" table. The user 12, via interactions with the GUI 14a, defines the trigger condition 510. For example, the user 12a selects a user input with a cursor (e.g., via a mouse, keyboard, touchscreen, voice commands, or any other user input). Here, the run pane 540 displays a graphical representation of an action response 520. In this example, the action response 520 (i.e., to the trigger condition 510 of a new row added to "Leads") is sending a request as a chat card. The user 12, via interactions with the GUI 14a, defines the action response 520 that will occur when the trigger condition 510 is satisfied. In some examples, the action response 520 includes executing one or more scripts selected or defined by the user 12. The user 12 may add any number of action responses 520 based off one or more trigger conditions 510. The settings pane 550 may include a variety of options allowing the user 12 to configure, publish, and/or deploy the application 190 in the no-code environment. Here, the settings pane 550 includes options for the user 12 to select event types, data sources, and action sources.

FIG. 6 is a flowchart of an exemplary arrangement of operations for a method 600 for automatic generation of chat applications from no-code application development platforms or environments. The computer-implemented method 600, when executed by data processing hardware 144, causes the data processing hardware 144 to perform operations. The method 600, at operation 602, includes receiving a deployment request 24 requesting deployment of a no-code application 190 generated by a user 12 within a no-code environment frontend 174 to a chat application environment frontend 204. The no-code application includes a trigger condition 510, an action response 520 defining an action in response to the trigger condition 510 being satisfied, and a no-code environment graphical user interface (GUI) view 500 based on the action response 520. At operation 604, the method 600 includes, after receiving the deployment request 24, receiving an application interaction indication 30 indicating that the trigger condition 510 is satisfied. In response to receiving the application interaction indication 30, the method 600, at operation 606, includes executing the action response 520 and, at operation 608, translating the no-code environment GUI view 500 into a chat application GUI view 410. At operation 610, the method 700 includes transmitting the chat application GUI view 410 to a user device 10. The chat application GUI view 410 is configured to cause the user device 10 to display the chat application GUI view 410 within the chat application environment frontend 204.

Figure 7:
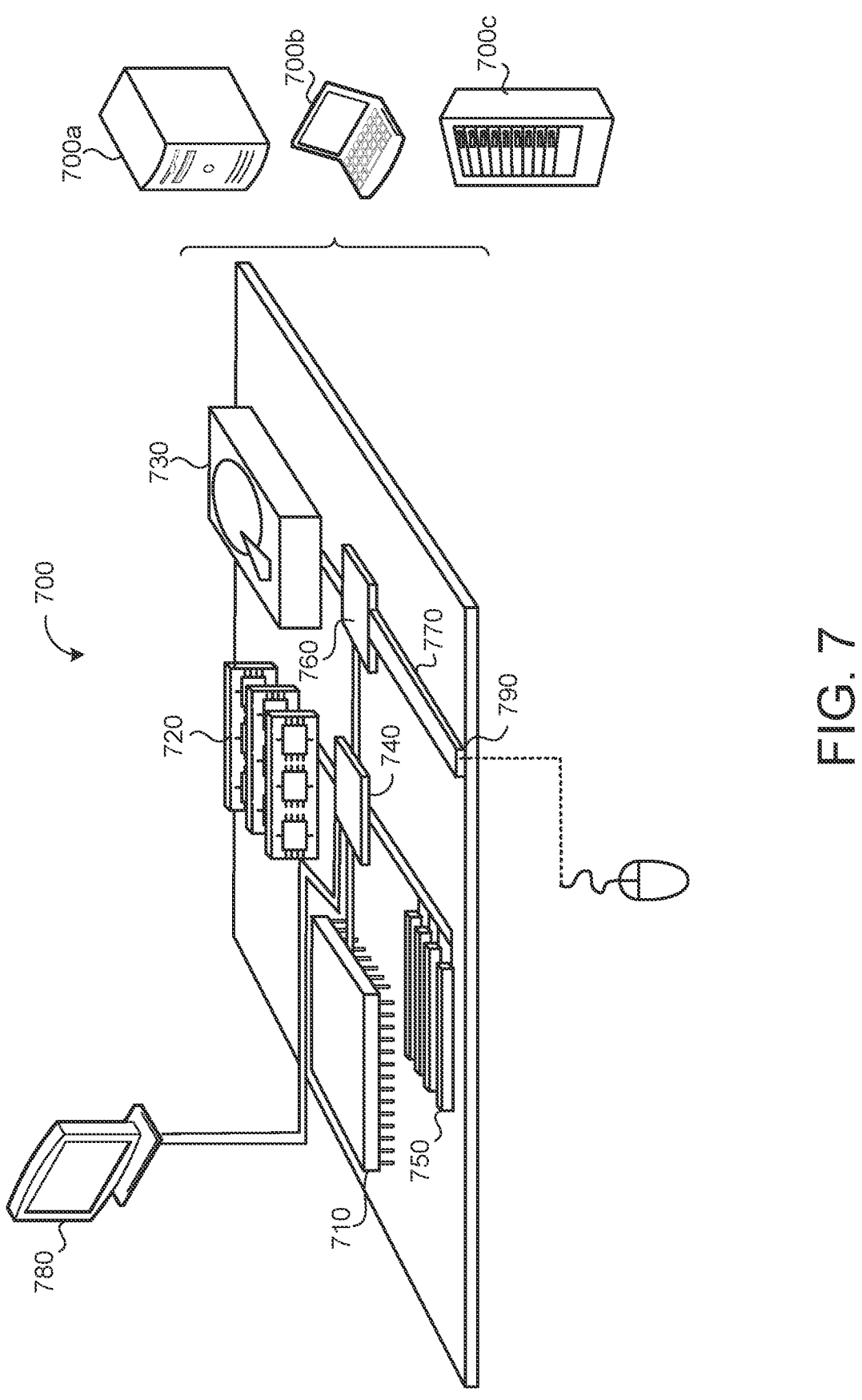
FIG. 7 is a schematic view of an example computing device that may be used to implement the systems and methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:

generating, by data processing hardware, a no-code application using a no-code application development environment, the no-code application including:

a trigger condition, the trigger condition being a modification to a subset of data stored at a data repository;

an action response defining an action in response to the trigger condition being satisfied; and a no-code environment graphical user interface (GUI) view based on the action response;

receiving, by the data processing hardware, a deployment request requesting deployment of the no-code application within a chat application environment;

after deployment of the no-code application within the chat application environment, receiving, by the data processing hardware and from a user of a user device, a chat application interaction with the chat application environment;

after receiving the chat application interaction, receiving, by the data processing hardware and from the user device, data requested by a data request chat card, wherein the data request chat card is based on the trigger condition of the no-code application;

modifying, by the data processing hardware and based on the data requested by the data request chat card, a portion of data stored at the data repository;

responsive to modifying the portion of data stored at the data repository, determining, by the data processing hardware, that the trigger condition is satisfied; and responsive to determining that the trigger condition is satisfied:

executing, by the data processing hardware, the action response;

translating, by the data processing hardware, the no-code environment GUI view into a chat application GUI view by, at least, generating, based on the action response and no-code environment GUI view, a functionality and a structure of the chat application GUI view, wherein the chat application GUI view includes at least a portion of the modified data; and transmitting, by the data processing hardware, the chat application GUI view to the user device, the chat application GUI view configured to cause the user device to display the chat application GUI view within the chat application environment.

2. The method of claim 1, wherein the chat application GUI view includes a chat card.

3. The method of claim 1, wherein the trigger condition includes a user interaction with the chat application environment.

4. The method of claim 3, wherein the user interaction includes a slash command, an emoji, or a keyword.

5. The method of claim 1, wherein the modification to the subset of data stored at the data repository includes adding or updating a row of a table.

6. The method of claim 1, further comprising, after transmitting the chat application GUI view to the user device:

receiving, by the data processing hardware and from the user device, a user interaction indication indicating a user interaction with the chat application environment; and modifying, by the data processing hardware and using the no-code application, the data repository based on the user interaction indication.

7. The method of claim 1, further comprising:

determining, by the data processing hardware, that a user of the user device is authorized to access the no-code application, wherein translating the no-code environment GUI view into the chat application GUI view is based on determining that the user of the user device is authorized to access the no-code application.

8. The method of claim 1, wherein the action response includes a direct message to a single user of the chat application environment.

9. The method of claim 1, wherein the action response includes a group message to a plurality of users of the chat application environment.

10. A system comprising:

data processing hardware; and memory hardware in communication with the data processing hardware, the memory hardware storing instructions that when executed on the data processing hardware cause the data processing hardware to:

generate a no-code application using a no-code application development environment, the no-code application including:

a trigger condition, the trigger condition being a modification to a subset of data stored at a data repository;

an action response defining an action in response to the trigger condition being satisfied; and a no-code environment graphical user interface (GUI) view based on the action response;

receive a deployment request requesting deployment of the no-code application within a chat application environment;

after deployment of the no-code application within the chat application environment, receive, from a user of a user device, a chat application interaction with the chat application environment;

after receiving the chat application interaction, receive, from the user device, data requested by a data request chat card, wherein the data request chat card is based on the trigger condition of the no-code application;

modify, based on the data requested by the data request chat card, a portion of data stored at the data repository;

responsive to modifying the portion of data stored at the data repository, determine that the trigger condition is satisfied; and responsive to determining that the trigger condition is satisfied:

execute the action response;

translate the no-code environment GUI view into a chat application GUI view by, at least, generating, based on the action response and no-code environment GUI view, a functionality and a structure of the chat application GUI view, wherein the chat application GUI view includes at least a portion of the modified data; and transmit the chat application GUI view to the user device, the chat application GUI view configured to cause the user device to display the chat application GUI view within the chat application environment.

11. The system of claim 10, wherein the chat application GUI view includes a chat card.

12. The system of claim 10, wherein the trigger condition includes a user interaction with the chat application environment.

13. The system of claim 12, wherein the user interaction includes a slash command, an emoji, or a keyword.

14. The system of claim 10, wherein the modification to the subset of data stored at the repository includes adding or updating a row of a table.

15. The system of claim 10, wherein the instructions further cause the data processing hardware to, after transmitting the chat application GUI view to the user device:

receive, from the user device, a user interaction indication indicating a user interaction with the chat application environment; and modify, using the no-code application, the data repository based on the user interaction indication.

16. The system of claim 10, wherein the instructions further cause the data processing hardware to:

determine that a user of the user device is authorized to access the no-code application, wherein translating the no-code environment GUI view into the chat application GUI view is based on determining that the user of the user device is authorized to access the no-code application.

17. The system of claim 10, wherein the action response includes a direct message to a single user of the chat application environment.

18. The system of claim 10, wherein the action response includes a group message to a plurality of users of the chat application environment.

* * * * *